US008630997B1

(12) United States Patent
Kulkin et al.

(10) Patent No.: US 8,630,997 B1
(45) Date of Patent: Jan. 14, 2014

(54) STREAMING EVENT PROCESING

(75) Inventors: Maxim Kulkin, Saratov (RU); Roman Alekseenkov, Saratov (RU); Andrew Lazarev, Saratov (RU); Maxim Zhilyaev, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 550 days.

(21) Appl. No.: 12/398,810

(22) Filed: Mar. 5, 2009

(51) Int. Cl.
*G06F 17/30* (2006.01)

(52) U.S. Cl.
USPC ........................................................ 707/713

(58) Field of Classification Search
USPC .......... 707/713, 718, 728, 731, 763, E17.008, 707/E17.014, 999.101, 999.003; 715/234; 726/11
See application file for complete search history.

(56) References Cited

U.S. PATENT DOCUMENTS

| | | | |
|---|---|---|---|
| 6,826,568 B2 * | 11/2004 | Bernstein et al. | 707/749 |
| 7,162,485 B2 | 1/2007 | Gottlob et al. | |
| 7,171,407 B2 | 1/2007 | Barton et al. | |
| 7,340,728 B2 * | 3/2008 | Kutter | 717/139 |
| 7,444,330 B2 * | 10/2008 | Bernstein et al. | 1/1 |
| 2004/0068494 A1 * | 4/2004 | Tozawa et al. | 707/3 |
| 2004/0073541 A1 * | 4/2004 | Lindblad et al. | 707/3 |
| 2004/0193607 A1 * | 9/2004 | Kudo et al. | 707/9 |
| 2004/0205082 A1 * | 10/2004 | Fontoura et al. | 707/101 |
| 2004/0261019 A1 * | 12/2004 | Imamura et al. | 715/513 |
| 2005/0149503 A1 * | 7/2005 | Raghavachari | 707/3 |
| 2005/0203957 A1 | 9/2005 | Wang et al. | |
| 2005/0216555 A1 * | 9/2005 | English et al. | 709/204 |
| 2005/0257201 A1 * | 11/2005 | Rose et al. | 717/136 |
| 2006/0253430 A1 * | 11/2006 | Fernandes et al. | 707/3 |
| 2007/0005622 A1 * | 1/2007 | Fernandes et al. | 707/101 |
| 2008/0082484 A1 * | 4/2008 | Averbuch et al. | 707/3 |
| 2009/0037379 A1 * | 2/2009 | Bou-Diab et al. | 707/3 |
| 2009/0125495 A1 * | 5/2009 | Zhang et al. | 707/4 |

OTHER PUBLICATIONS

Mehmet Altinel, Michael J. Franklin, Efficient Filtering of XML Documents for Selective Dissemination of Information, Proceedings of the 26th International Conference on Very Large Data Bases, p. 53-64, Sep. 10-14, 2000.*
U.S. Appl. No. 11/971,794, Ramarao, Karempudi et al.
He, Bingsheng et al., "Cache-Conscious Automata for XML Filtering", Proceedings of the 21st International Conference on Data Engineering (ICDE 2005), (Apr. 5-8, 2005), pp. 1-12.
Onizuka, Makoto et al., "Light-weight XPath Processing of XML Stream with Deterministic Automata", Proceedings of the 12th International Conference on Information and Knowledge Management New Orleans, Louisiana, (Nov. 3-8, 2003), pp. 1-8.

(Continued)

*Primary Examiner* — Fred I Ehichioya
*Assistant Examiner* — Richard Bowen

(57) ABSTRACT

A query (e.g., an extensible markup language (XML) Path or XPath query) for one or more components of a document (e.g., XML document) may be received. A forward axis graph including a plurality of nodes with edges connecting the nodes may be generated based on the query and corresponding to a traversal of the document as associated with events (e.g., XML SAX events) corresponding to the document. A plurality of matching states of the forward axis graph including at least one final state may be identified, each matching state including a subset of the nodes wherein each incoming edge to the subset originates from one of the nodes of the subset. Whether the one or more components of the query exist within the document may be based on which events correspond to transitions between the matching states and whether the final state is achieved.

25 Claims, 8 Drawing Sheets

(56) References Cited

OTHER PUBLICATIONS

Chen, Danny et al., "Optimizing The Lazy DFA Approach for XML Stream Processing", Proceedings of the 15th Australasian Database Conference vol. 27 (ADC 2004) Dunedin, New Zealand, (2004), pp. 1-10.

Green, Todd J., et al., "Processing XML Streams with Deterministic Automata", Xyleme SA, Saint-Cloud, France, (2001), pp. 1-17.

Olteanu, Dan et al., "Symmetry in XPath", Technical Report, Computer Science Institute, Munich Germany Forschungsbericht/Research Report PMS-FB-2001-16, Oct. 2001, pp. 1-38.

Olteanu, Dan et al., "XPath: Looking Forward", Technical Report, Computer Science Institute, Munich, Germany Forschungsbericht/Research Report PMS-FB-2001—Dec. 17, 2001, pp. 1-37.

Peng, Feng et al., "XSQ: Streaming XPath Queries", Department of Computer Science University of Maryland, College Park, Maryland 20742, (Sep. 18, 2002), pp. 1-4.

\* cited by examiner

STREAMING EVENT PROCESING

TECHNICAL FIELD

This description relates to processing streaming events.

BACKGROUND

XPath is a programming language that may be used to identify subelements of documents in the Extensible Markup Language (XML); it has numerous applications including those in business software and network routing. XPath queries define an analysis that can be performed to an XML document to produce a result set, which may be a subset of the document. A software program or other logic that applies an XPath query to XML documents to produce a result set may sometimes be referred to as an XPath processor. Most XPath processors operate on a tree representation of XML documents, using a process known as the Document Object Model (DOM). Other processors may treat the XML document as a stream of events using a method known as Simple API for XML (SAX).

Processing an XML document using the DOM process may be effective, but may require significant resources in constructing the DOM tree, which may slow the overall functionality of a system or device. A common technique used to process an XML document as SAX events is converting XPath statements in deterministic finite automata (DFAs). DFA processing however is limited in that a processor can only handle those XPath statements for which DFAs have already been defined.

DESCRIPTION OF EXAMPLE EMBODIMENTS

Overview

Figure 1:
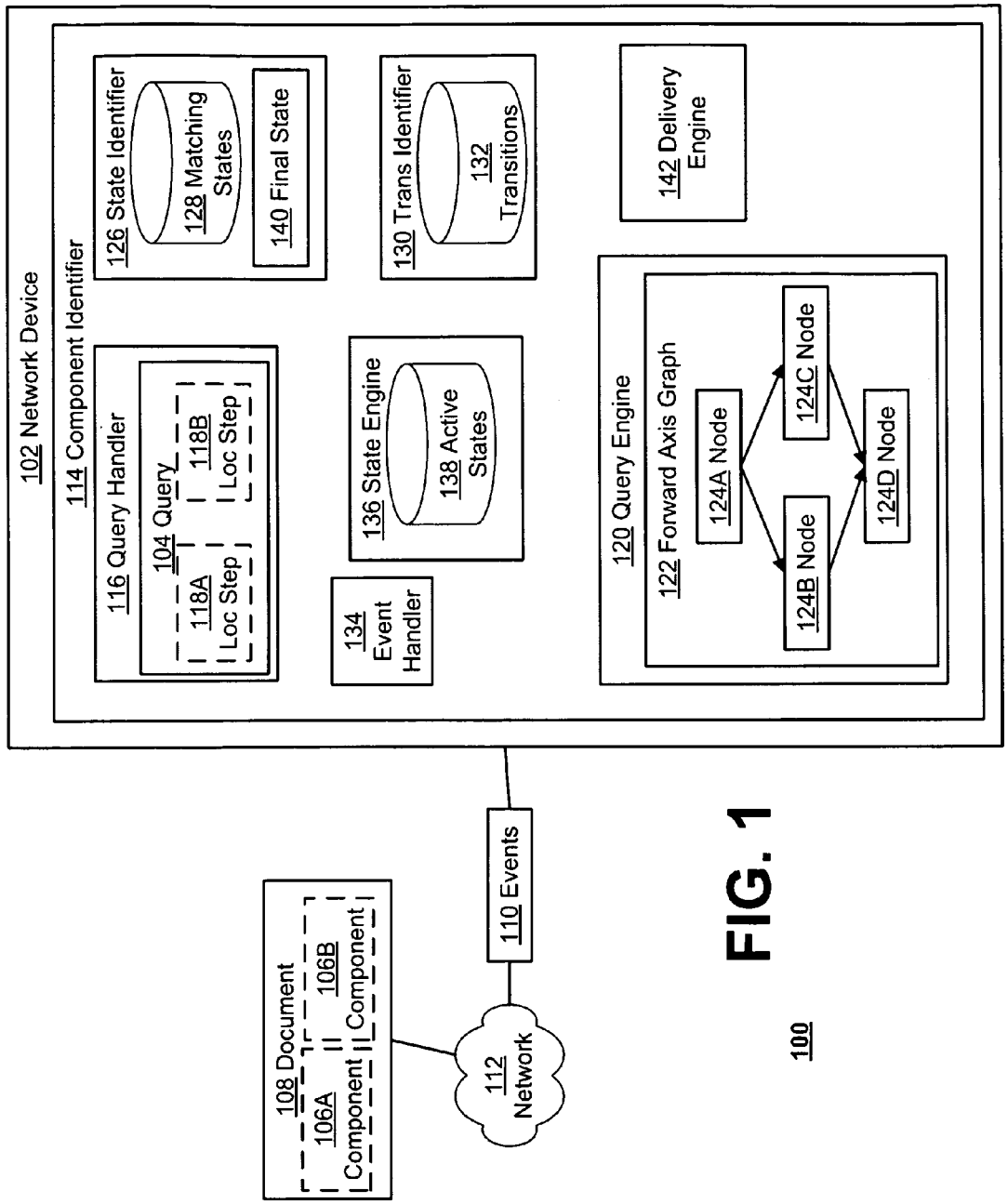
FIG. 1 is a block diagram of a streaming event processing system, according to an example embodiment.

According to an example embodiment, an apparatus is provided. A query handler may receive a query for one or more components of a document. An event handler may receive events corresponding to the document. A query engine may generate a forward axis graph based on the query and corresponding to an in-order traversal of the document as associated with the events, the forward axis graph including a plurality of nodes with edges connecting the nodes. A state identifier may identify a plurality of matching states of the forward axis graph including at least one final state, each matching state including a subset of one or more of the nodes wherein each incoming edge to the subset originates from one of the nodes of the subset. A transition identifier may determine transitions between the matching states. A state engine may determine whether the final state is achieved based on which of the received events correspond to the transitions and determine whether the one or more components of the query exist within the document based on whether the final state is achieved.

According to an example embodiment, a method is provided. A forward axis graph may be generated based on a query for one or more components of a document, the forward axis graph including a plurality of nodes connected by edges and arranged based on an in-order traversal of events corresponding to the document. A plurality of matching states may be identified within the forward axis graph, each matching state including a subset of the nodes wherein each incoming edge to the nodes of the subset originates from a node of the subset. A final state for determining whether the one or more components of the document have been identified may be identified from the matching states. One or more transitions may be identified between each of the matching states based on the incoming edges. Whether the document includes the one or more components of the query may be determined based on whether the one or more transitions to the final state have been identified from amongst the events.

According to an example embodiment, a method for identifying one or more components of a document based on a stream of events corresponding to the document is provided. A forward axis graph may be determined based on a query for one or more components of a document, the forward access graph including nodes connected by edges corresponding to the query. The nodes may be arranged into a plurality of matching states with transitions between the matching states corresponding to the edges, each matching state including a subset of one or more of the nodes wherein each incoming edge to the subset originates from one of the nodes of the subset. A final state for determining whether the one or more components of the document have been identified may be identified from amongst the matching states. For each event of a stream of events corresponding to a document until the final state is achieved: a first event may be received from the stream of events, an event determination whether the first event corresponds to one of the transitions may be made, and whether the final state has been achieved may be determined based on the event determination. The one or more identified components may be provided based upon a determination of the final state being achieved.

The details of one or more implementations are set forth in the accompanying drawings and the description below. Other features will be apparent from the description and drawings, and from the claims.

Example Embodiments

FIG. 1 is a block diagram of a streaming event processing system 100, according to an example embodiment. In the example of FIG. 1, the system 100 may receive a query indicating components or subelements to be identified within a document or other data. The system 100 may organize or format the query (e.g., into a forward axis graph) so as to correspond with the organization and/or receipt of the document. Then for example, the system 100 may receive a stream or sequence of events or other data associated with the document, and using the formatted query, try to identify the specified components within the document. The system 100 may then return the identified components as located from the streamed events of the document or otherwise return an indication that the components could not be found or do not exist.

According to a non-limiting example embodiment, the system 100 may be used in an extensible markup language (XML) environment, for network traffic processing. For example, the document may include an XML document produced or otherwise received from user input to a web page. The components of the document to be located or otherwise identified by the system 100 may include, amongst other information, security or login information, such as user ID and/or password as provided by a user or system. The system 100 may receive an extensible stylesheet language (XSL) or XML path language (XPath) query specifying the security components to be searched for from the XML document, and the system 100 may arrange the XPath query into a forward axis graph that corresponds with an in-order traversal of the XML document.

The XML document may be read and/or processed as a stream or other sequence of events or data as received from a network using simple API for XML (SAX). The system 100 may receive the SAX events and, using the forward axis graph, may determine whether the identified security components (e.g., from the XPath query) exist within the XML document. Then for example, the system 100 may provide the security components to another system or device that may verify the security credentials of the user and may determine whether to grant access to a backend server or other device to the user. One skilled in the art would recognize that the XML environment and network traffic processing application as discussed herein is only one exemplary use of the system 100, and that the system 100 may be used in other environments and for other uses as well.

In the system 100, a network device 102 may receive a query 104 indicating one or more components 106A, 106B of a document 108 to be identified from a stream or other sequence of events 110 corresponding to the document 108. The network device 102 may include any network device, or portion thereof, configured to receive the events 110. For example, the network device 102 may include a server, firewall, gateway, router, switch, bridge or other network device. As referenced above, the network device 102 may include any network device that is configured to receive and process the events 110.

The query 104 may include any request or command indicating or specifying data to identify from the document 108. The query 104 may specify which component 106A of the document 108 if found within or amongst the events 110, is to be returned. Furthermore, the query 104 may describe the component 106A based, at least in part, on its relationship to other components 106B of the document 108. For example, the query 104 may indicate that component A is to be returned if found within the document 108, and that component A is the parent of component B and a child of component C. As indicated above, the query 104 may include an XPath query that indicates a result set to be returned if found within an XML document (e.g., 108).

The components 106A, 106B may include anything that may be searched or queried for from amongst the events 110 of the document 108. For example, the components 106A, 106B may include tagged or otherwise identified elements within the document 108. As referenced above, the document 108 may include an XML document whereby the components 106A and 106B may be tagged within the XML document 108 by one or more XML tags. The query 104 may indicate the tags (e.g., 106A, 106B) for which to be searched within the document 108, and the system 100 may return the values associated with the tags upon their identification within the document 108. According to an example embodiment, the components 106A, 106B (e.g., as specified by the query 104) may include elements, components, or other data or information that does not exist amongst the events 110 and/or the document 108.

According to another example embodiment, the components 106A, 106B may include optional components that may be returned if found. For example, the query 104 may include both mandatory or primary components that are being looked for within the document 108 and optional components that if found in addition to the primary components are to be returned as well. The query 104 may also specify target components, the values of which are to be returned if identified.

The document 108 may include any data or information, at least a portion of which is to be provided to the network device 102. The document 108 may include a structured document, such as a web-based document. For example, the document 108 may include an e-mail (including a document capable of attachment therewith), HTML, Java, XML or other document. As referenced above, the document 108 may (or may not) include the components 106A and 106B as identified by the query 104. The document 108 may then be provided, via network 112, to the network device 102 as one or more streamed or sequenced events 110.

The events 110 may include any data, information or portions of the document 108 that is provided to the network device 102. For example, the events 110 may include data packets or other formatted or unformatted units of data. The events 110 may be streamed or otherwise transmitted to the network device 102. As referenced above, the events 110 may include SAX events that are provided to the network device 102, including one or more portions of the document 108. Then, for example, a component identifier 114 may attempt to locate the one or more components 106A, 106B (as indicated by the query 104) within the document 108 from the streamed events 110 as received via the network 112.

The network 112 may include a computer or other communications or information network. For example, the network 112 may include a wired and/or wireless intranet, the Internet or other network including a wide area network (WAN) or local area network (LAN). The network 112 may receive the document 108 and stream or otherwise transmit the events 110 to the network device 102 as discussed above. According to an example embodiment, the network 112 may use SAX to stream the events 110 of the XML document 108 to the network device 102, where the streamed SAX events 110 may be processed by the component identifier 114.

The component identifier 114 may receive the query 104 and process the events 110 based on the query 104. The component identifier 114 may determine, from the query 104, which components 106A, 106B are to be identified within the document 108. The component identifier 114 may then locate the components 106A, 106B from amongst the streamed events 110 if they exist within the document 108. If however, the queried components 106A, 106B do not exist within the document 108 and the component identifier 114 is unable to locate them amongst the streamed events 110, the component identifier 114 may return an indication that the components 106A, 106B were not identified within the document 108 and/or amongst the events 110. The component identifier 114 may include multiple sub-components that perform the processing. For example, a query handler 116 may receive the query 104 (or multiple queries 104) from a system or user.

The query 104, as referenced above, may specify or describe which components 106A, 106B of the document 108 are to be located. For example, the query 104 may include one or more location steps 118A, 118B. The location steps 118A, 118B may include any description or identification of the components 106A, 106B, such as a relationship between the components 106A and 106B and other elements of the document 108. For example, the location steps 118A and 118B may describe a target component as being a descendant of a root node, a parent of a second component, and a child of a third component, wherein the third component is a sibling of a fourth component that is a child of the second component. Then for example, upon locating the target component, as determined based upon its relationships with the other described components (e.g., in the location steps 118A, 118B), the component identifier 114 may return the identified target component.

An example XPath query 104 may include "/descendant::A/descendant::B/parent::C". In the example XPath query 104, the location steps 118A, 118B may be "descendant::A", "descendant::B" and "parent::C". The components 106A, 106B to be identified from the stream of events 110 may be "A", "B" and "C". The component identifier 114 may determine from the XPath query 104 that the value of the target component "C", that is the parent of a component B that is a descendant of a component A, is to be returned if identified. The component identifier 114 may also determine from the XPath query 104 that the component A is a descendant of a root or base component.

A query engine 120 may generate a forward axis graph 122 from the query 104. The forward axis graph 122 may include an algorithm, analysis technique or other alternative expression of the query 104. The forward axis graph 122 may allow the component identifier 114 to analyze and process the events 110 as they are received, to determine whether the components 106A, 106B (as specified by the location steps 118A, 118B of the query 104) exist in the document 108. The forward axis graph 122 may provide advantages over traditional analysis techniques such as constructing a document object model (DOM) or deterministic finite automatas (DFAs).

Traditional analysis using a DOM may include constructing a DOM tree from the received events 110 which may use significant resources and slow overall processing and functionality by the network device 102. Constructing DFAs from the query 104 (e.g., XPath query) is another traditional technique, however DFAs may be limited in that they may limit the system 100 to only processing a subset of components 106A, 106B that may be searched (e.g., only those for components 106A, 106B which the DFAs have been defined). Thus, constructing the forward axis graph 122 may have the advantage of both allowing greater flexibility than using DFAs and may save on resources that may be used in constructing a DOM tree. The forward axis graph 122 may represent an algorithm that may be used to identify an expected, or matching, sequence of events 110 for each location step 118A, 118B of the query 104.

The query engine 120 may construct the forward axis graph 122 with nodes 124A-D. The nodes 124A-D may represent a sequence of one or more of the (expected) events 110 as corresponding to the location steps 118A and 118B of the query 104. The nodes 124A-D as shown in the forward axis graph 122 may be connected by edges (as indicated by the pointing lines). The arrangement of the nodes 124A-D within the forward axis graph 122 may correspond to an in-order traversal of the document 108 and/or the sequence of events 110. For example, the XPath query 104 provided above of "/descendant::A/descendant::B/parent::C" may be represented in the forward axis graph 122 as shown in FIG. 2A.

Figure 2A:
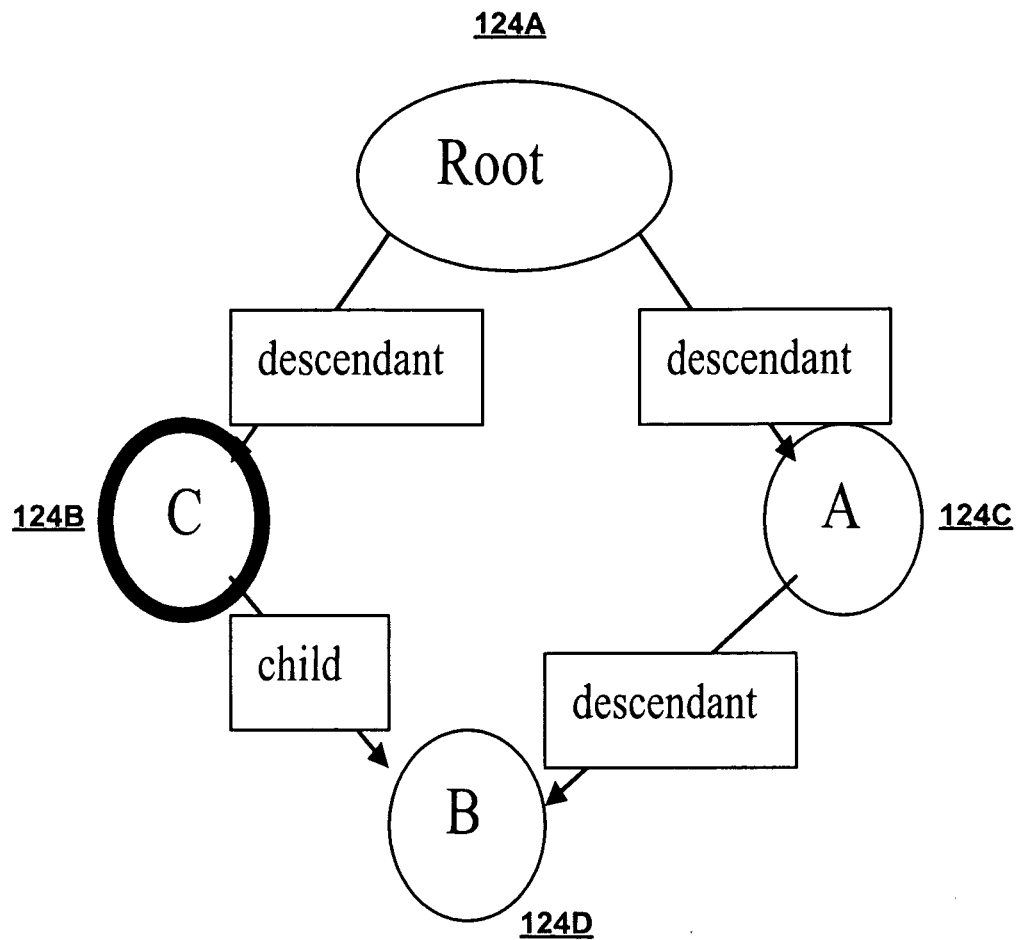
FIG. 2A is an example forward axis graph from the system of FIG. 1, according to an example embodiment.

For example, as shown in FIG. 2A, the components 106 "Root", "C", "A" and "B" may be shown as nodes 124A-D, respectively along with the relationships as determined from the exemplary XPath query 104. Node B, as shown in the example query 104, may be a descendant of node A and have a parent C. As shown, however, rather than depicting node B as having a parent C, the forward axis graph 122 shows node C having a child B, which would correspond to an in-order traversal of the document 108. Because for example, a tree structure of the document 108 may include a parent node (e.g., node 124B) that appears prior to a child node (e.g., node 124D), thus the forward axis graph 122 uses a similar construction. Similarly, the events 110 may be received in such an order that a parent arrives before a child, thus the forward axis graph 122 represents this contingency. Based on the exemplary forward axis graph 122, the bolded node 124B (e.g., target component 106) may represent the value that is returned if identified within the events 110.

Returning to FIG. 1, a state identifier 126 may identify a plurality of matching states 128 from the forward axis graph 122. A matching state 128 may include a subset of one or more of the nodes 124A-D wherein each incoming edge to a node of the subset originates from one of the nodes of the subset. For example, the node 124A may be one matching state 128, the nodes 124A and 124B may be a second matching state 128, but the nodes 124A, 124B and 124D may not be a matching state 128 because of the incoming edge from the node 124C which was not included as part of the subset.

Figure 2B:
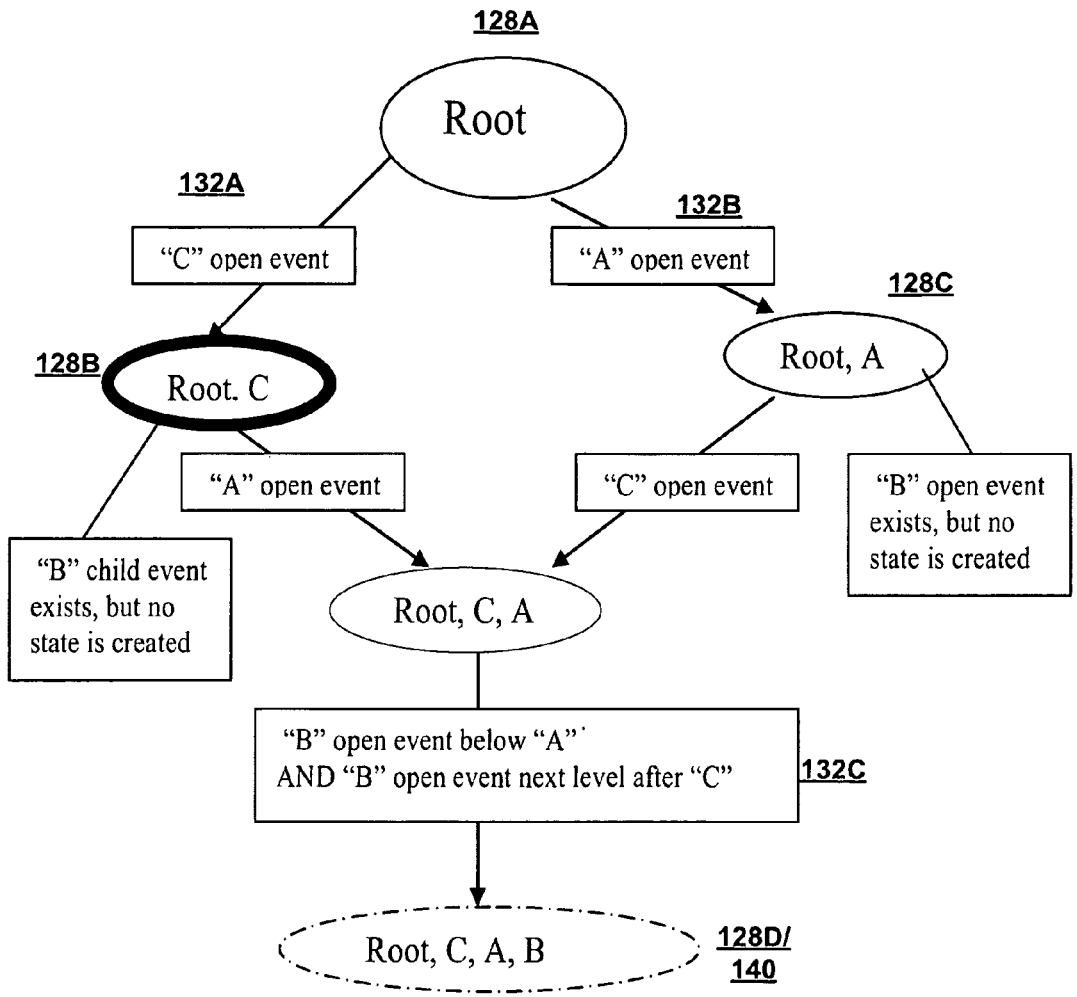
FIG. 2B is an example forward axis graph from the system of FIG. 1, according to an example embodiment.

A transition identifier 130 may identify transitions 132 from the forward axis graph 122. A transition 132 may include one or more events 110 (or anticipated events 110) that correspond to an edge (or multiple edges) of the forward axis graph 122 that differentiates a first matching state 128 from a second matching state 128. For example, as shown in FIG. 2B, the forward axis graph 122 may include the transitions 132A, 132B and 132C between various matching states 128A-D. For example, the matching states 128A-D may include "Root", "Root, C", "Root, A" and "Root, C, A, B", respectively. Transition 132C is a multiple event 110 transition, in that neither "Root, C, B" nor "Root, C, A" are a matching state 128, thus in order to transition from either matching states "Root, A" 128C or "Root, C" 128B into the next matching state both events 110 as listed in the transition 132C are to occur or otherwise be determined.

An event handler 134 (FIG. 1) may receive the events 110. The event handler 134 may receive and provide the events 110 to a state engine 136 that may compare the received event(s) 110 against the forward axis graph 122 (e.g., as shown in FIG. 2B). The state engine 134 may perform a comparison between a received event 110 and the transitions 132 (e.g., as identified from the forward axis graph 122), wherein the state engine 134 may determine which matching state(s) 128 are currently active (e.g., active states 138) and whether a transition 132 has been received or detected.

The state engine 136 may determine which of the matching states 128 are currently active (e.g., active states 138) or have otherwise been achieved. The active states 138 may include any of the matching states 128 where events 110 have been received correspond to the transitions 132 associated with the active states 138. For example, upon the receipt or determination of a root event 110, the root matching state 128A (as shown in FIG. 2B) may be identified as an active state 138. Then for example, upon a receipt and determination of a "A" open event 110, corresponding to the transition 132B, the matching state 124C may become an active state 138. Then for example, both the matching states 124A and 124C may be identified as active states 138.

The state identifier 126 may identify one or more final states 140 from amongst the matching states 128. The final state 140 may include any matching state 128, that once achieved or otherwise identified as active (e.g., active state 138), indicates that the components 106A, 106B as identified by the query 104 have been located or identified amongst the events 110. Then for example, upon a determination of the final state 140, the component identifier 114 may determine that the components 106A, 106B do or do not exist within the document 108, and if they exist, return values associated with the identified components 106A, 106B.

The state engine 136 may determine whether the final state 140 has been achieved or otherwise becomes identified as active (e.g., 138). For example, the final state 140 in the forward axis graph 122 (as shown in FIG. 2B) may include all the nodes "Root", "C", "A" and "B" (e.g., 124A-D) corresponding to the components 106A, B. Then for example, if the events 110 corresponding to the transitions 132A, 132B and 132C are received, the state engine 136 may determine that the final state 140 has been achieved and the components 106A, B do exist within the document 108. A delivery engine 142 may then provide the target node 124B "C" (see FIG. 2A) as a result set of the query 104.

The state engine 136 may also determine that upon a receipt of final event 110, that the final state 140 has not been achieved and that the document 108 does not include the specified components 106A, 106B. For example, the event handler 134 may determine that a final event 110 has been received indicating an end of the stream of events 110 and/or the document 108. Then for example, the state engine 136 may determine from the active states 138 whether the final state 140 has been achieved. If, for example, the final state 140 has not yet been achieved and the final event 110 has been detected, then the state engine may determine that one or more of the components 106A, 106B could not be identified within the document 108 and/or stream of events 110. Then for example, the delivery engine 142 may return an indication that the document 108 does not include one or more of the specified components 106A, 106B. In other example embodiments, multiple and/or alternative final states 140 may exist within the forward axis graph 122.

The delivery engine 142, as referenced above, may deliver or provide the result from the component identifier 114. For example, the delivery engine 142 may provide an indication that the components 106A, 106B could not be identified, or perhaps return nothing if an identification could not be made. Or for example, if one or more of the components 106A, 106B were identified amongst the events 110, the delivery engine 142 may provide values associated with the identified components 106A, 106B.

As discussed above, the system 100 may be used to extract network traffic processing information from events 110 or other data packets traveling over, through or via a network 112. The component identifier 114 may identify the relevant components 106A, 106B from a document 108 of information, and provide those components 106A, B, when identified, to another system for verification and/or other additional processing.

FIG. 2A is an example forward axis graph 122 from the system 100 of FIG. 1, according to an example embodiment. As described above, the forward axis graph 122 may be constructed by the query engine 120 based on an example query 104 /descendant::A/descendant::B/parent::C. The forward axis graph 122 of FIG. 2A depicts the relationships amongst the nodes 124A-D as determined from the query 104. Other example embodiments may include different nodes 124A-C, organized differently based on different queries 104.

FIG. 2B is an example forward axis graph 122 from the system 100 of FIG. 1, according to an example embodiment. As described above, the forward axis graph 122 of FIG. 2B includes the transitions 132A-C and the matching states 128A-D as determined based on the exemplary query 104 "/descendant::A/descendant::B/parent::C" and the final state 140. Other example embodiments may include nodes organized based on different and/or additional queries 104.

Figure 3:
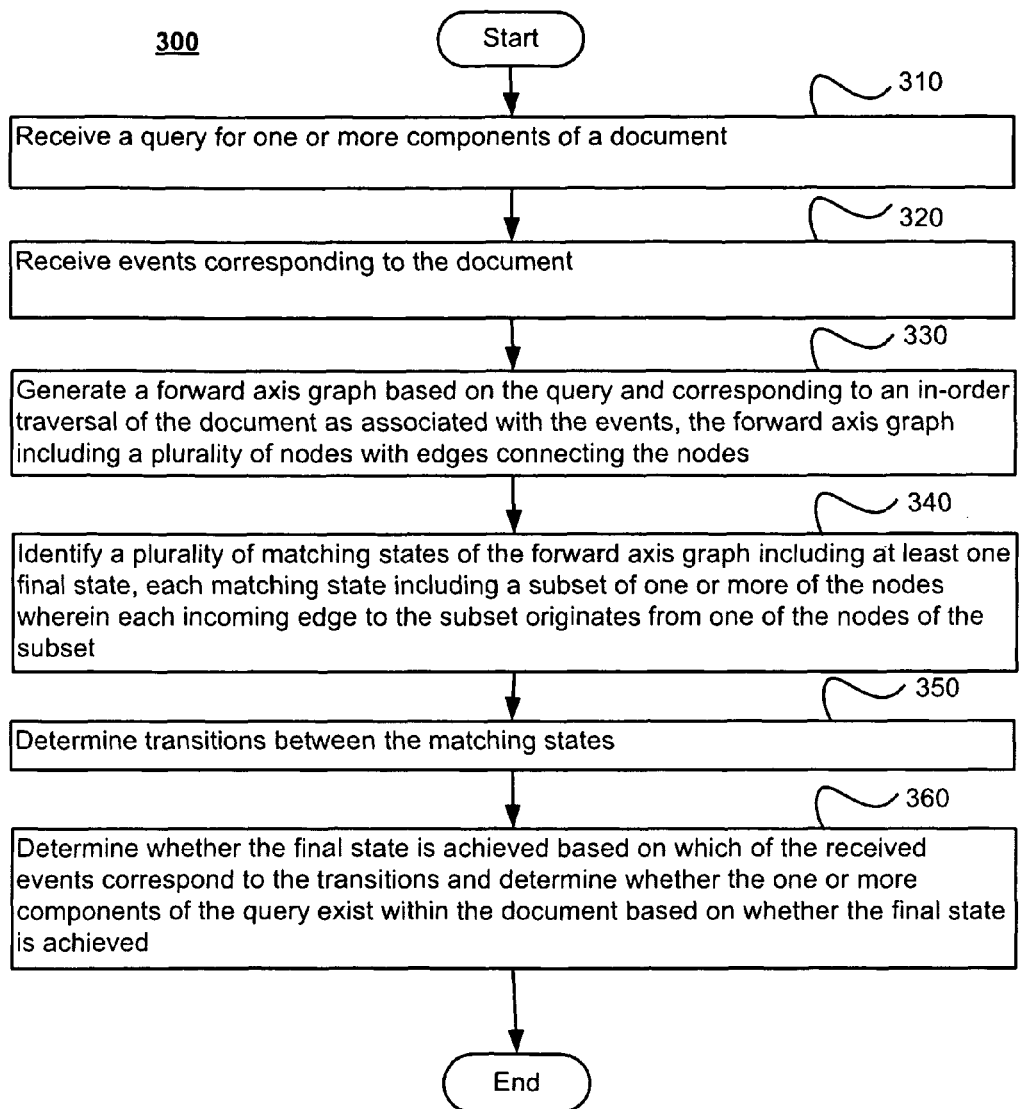
FIG. 3 is a flowchart illustrating example operations of the system of FIG. 1.

FIG. 3 is a flowchart 300 illustrating example operations of the system of FIG. 1. More specifically, FIG. 3 illustrates an operational flow 300 representing example operations related processing streaming events, according to an example embodiment. While FIG. 3 illustrates an example operational flow 300 representing example operations related to the system of FIG. 1, it should be appreciated however that the operational flow 300 is not limited to the example of the system of FIG. 1 and may be applied to other systems.

After a start operation, a query for one or more components of a document may be received (310). For example, as shown in FIG. 1, the query handler 116 may receive the query 104 for the components 106A, 106B of the document 108. The query 104 may include the location steps 118A, 118B identifying the components 106A, 106B.

Events corresponding to the document may be received (320). For example, the event handler 134 may receive the events 110 corresponding to the document 108.

A forward axis graph may be generated based on the query and corresponding to an in-order traversal of the document as associated with the events, the forward axis graph including a plurality of nodes with edges connecting the nodes (330). For example, the query engine 120 may generate the forward axis graph 122 based on the query 104 and corresponding to an in-order traversal of the document 108 as associated with the events 110, the forward axis graph 122 including the nodes 124A-D with edges (as indicated by the arrows) connecting the nodes 124A-D.

A plurality of matching states of the forward axis graph including at least one final state may be identified, each matching state including a subset of one or more of the nodes wherein each incoming edge to the subset originates from one of the nodes of the subset (340). For example, the state identifier 126 may identify the matching states 128 of the forward axis graph 122, including the final state 140. As shown in FIG. 2B, the matching states 128A-D may include a subset of the nodes 124A-D wherein each incoming edge to the subset originates from one of the nodes 124A-D of the subset.

Transitions between the matching states may be determined (350). For example, the transition identifier 130 (FIG. 1) may determine the transitions 132A-C between the matching states 128A, 128B, 128C and 128D as shown in FIG. 2B.

Whether the one or more components of the query exist within the document may be determined based on which of the received events correspond to the transitions and whether the final state is achieved (360). For example, the event handler 134 may receive the events 110 and the state engine 136 may determine which of the received events 110 correspond to the transitions 132 and update the active states 138 accordingly. Then for example, the state engine 136 may determine from the active states 138 whether the final state 140 has been achieved and whether the components 106A and 106B of the query 104 exist within the document 108.

Figure 4:
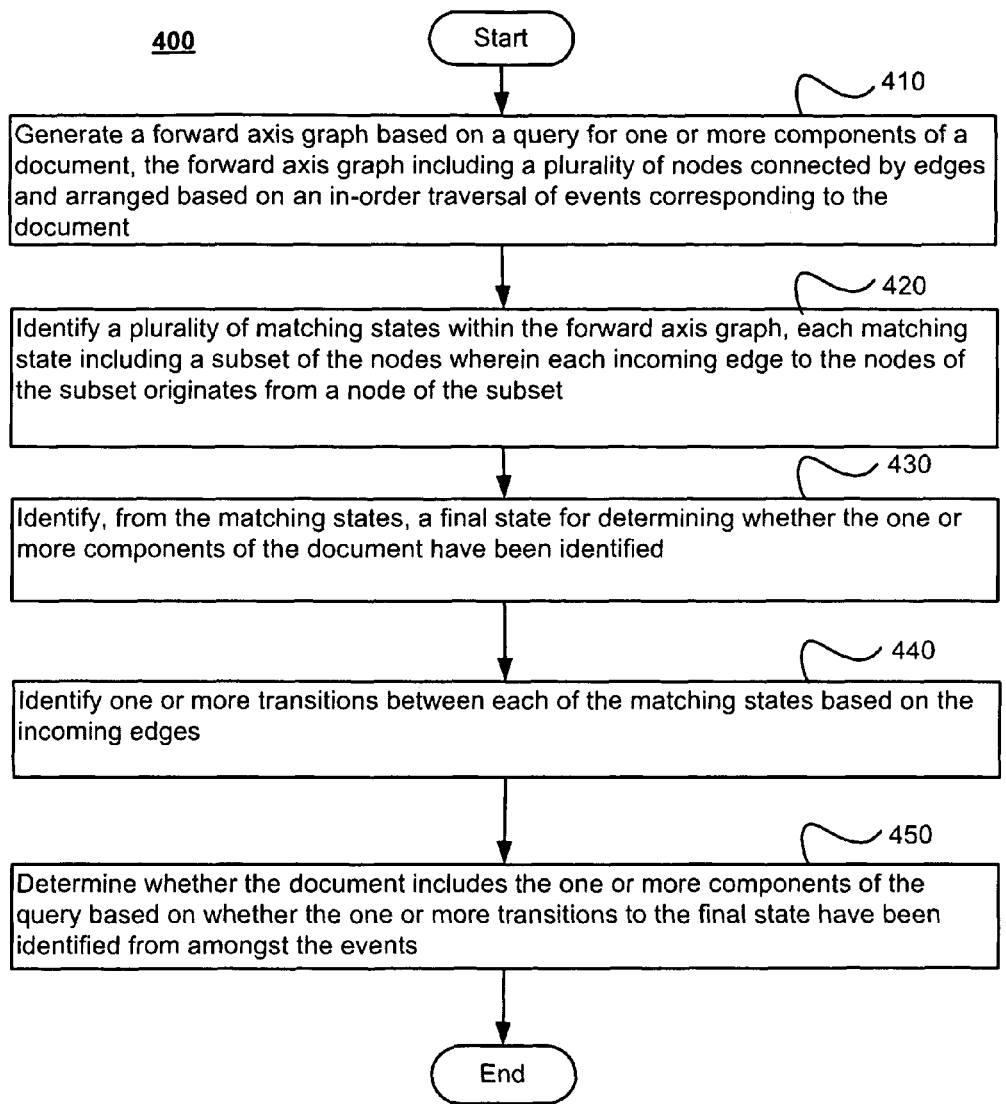
FIG. 4 is a flowchart illustrating example operations of the system of FIG. 1.

FIG. 4 is a flowchart 400 illustrating example operations of the system of FIG. 1. More specifically, FIG. 4 illustrates an operational flow 400 representing example operations related processing streaming events, according to an example embodiment. While FIG. 4 illustrates an example operational flow 400 representing example operations related to the system of FIG. 1, it should be appreciated however that the operational flow 400 is not limited to the example of the system of FIG. 1 and may be applied to other systems.

After a start operation, a forward axis graph may be generated based on a query for one or more components of a document, the forward axis graph including a plurality of nodes connected by edges and arranged based on an in-order traversal of events corresponding to the document (410). For example, the query handler 116 may receive the query 104 for the components 106A, 106B of the document 108. Then for example, the query engine 120 may generate the forward axis graph 122 based on the query 104, the forward axis graph 122 including the nodes 124A-D with edges (as indicated by the arrows) connecting the nodes (as shown in FIG. 2A).

A plurality of matching states may be identified within the forward axis graph, each matching state including a subset of the nodes wherein each incoming edge to the nodes of the subset originates from a node of the subset (420). For example, the state identifier 126 may identify the matching states 128 within the forward axis graph 122. The state identifier 126 may, for example as shown in FIG. 2B, identify the matching states 128A-D, each matching state 128A-D including a subset of the nodes (e.g., 124A-C as shown in FIG. 2A) wherein each incoming edge to the nodes of the subset originating from a node of the subset.

A final state for determining whether the one or more components of the document have been identified may be identified from the matching states (430). For example, the state identifier 126 may identify the final state 140 for determining whether the components 106A and 106B of the document 108 have been identified.

One or more transitions may be identified between each of the matching states based on the incoming edges (440). For example, the transition identifier 130 (FIG. 1) may identify the transitions 132A-C (FIG. 2B) between each of the matching states 128A-D based on the incoming edges.

Whether the document includes the one or more components of the query may be determined based on whether the one or more transitions to the final state have been identified from amongst the events (450). For example, the state engine 136 may determine whether the transitions 132 to the final state 140 have been identified from amongst the events 110. Then for example, state engine 136 may determine whether the document 108 includes the components 106A, 106B of the query 104 based on whether the final state 140 has been achieved.

Figure 5:
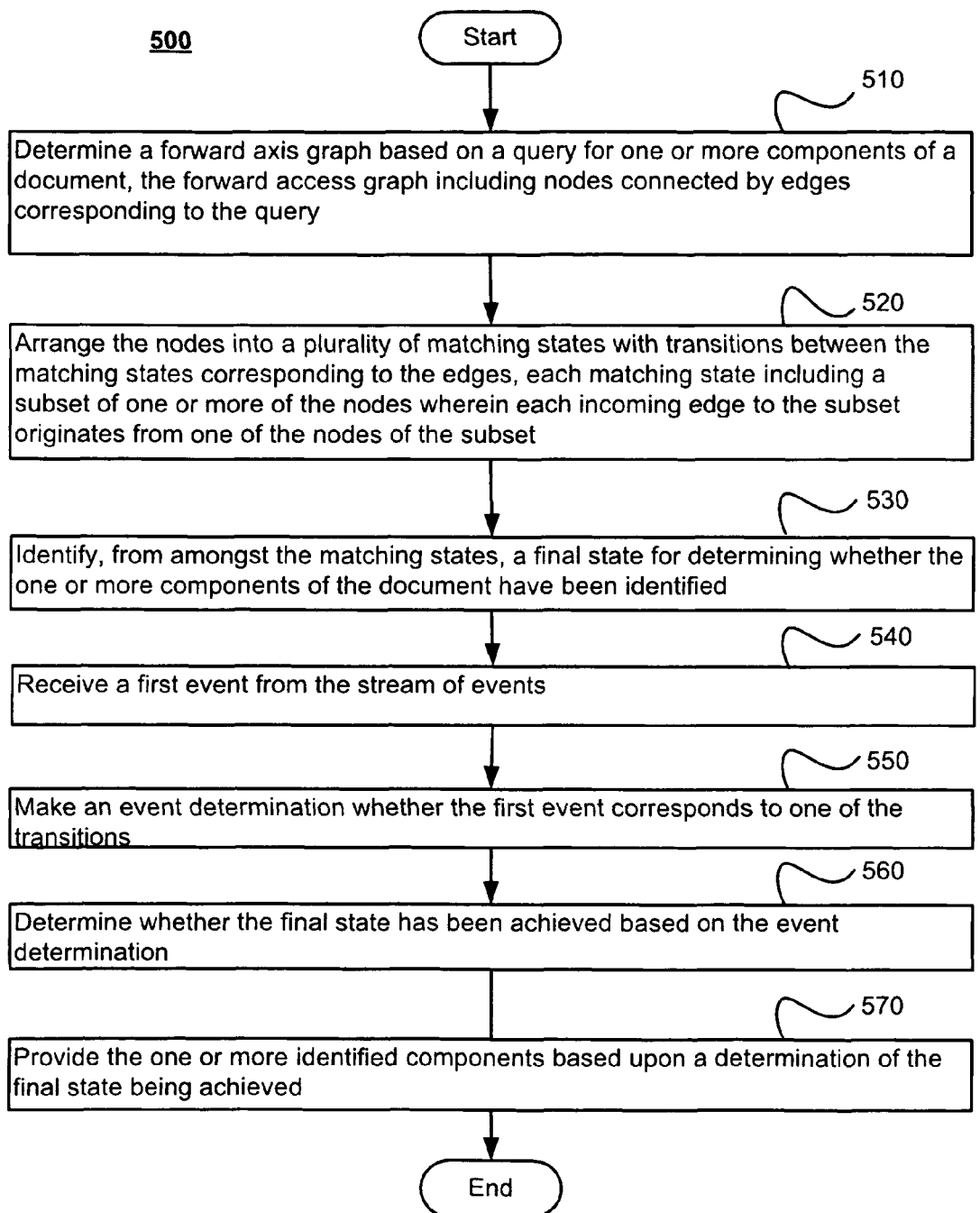
FIG. 5 is a flowchart illustrating example operations of the system of FIG. 1.

FIG. 5 is a flowchart 500 illustrating example operations of the system of FIG. 1. More specifically, FIG. 5 illustrates an operational flow 500 representing example operations related processing streaming events, according to an example embodiment. While FIG. 5 illustrates an example operational flow 500 representing example operations related to the system of FIG. 1, it should be appreciated however that the operational flow 500 is not limited to the example of the system of FIG. 1 and may be applied to other systems.

After a start operation, a forward axis graph may be determined based on a query for one or more components of a document, the forward access graph including nodes connected by edges corresponding to the query (510). For example, as shown in FIG. 1, the query handler 116 may receive the query 104 for the components 106A, 106B of the document 108. Then for example, the query engine 120 may determine the forward axis graph 122 including the nodes 124A-D with edges (as indicated by the arrows) connecting the nodes 124A-D.

The nodes may be arranged into a plurality of matching states with transitions between the matching states corresponding to the edges, each matching state including a subset of one or more of the nodes wherein each incoming edge to the subset originates from one of the nodes of the subset (520). For example, the query engine 120 may arrange the nodes 124A-D into a plurality of matching states 128 corresponding to the edges. For example, as shown in FIG. 2B, the matching states 128A-D include a subset of one or more of the nodes 124A-D (FIG. 2A) wherein each incoming edge to the subset originates from one of the nodes 124A-D of the subset.

A final state, for determining whether the one or more components of the document have been identified, may be identified from amongst the matching states (530). For example, the state identifier 126 may identify the final state 140 for determining whether the components 106A and 106B of the document 108 have been identified.

A first event from the stream of events may be received (540). For example, the event handler 134 may receive a first event 110 from the stream of events 110.

An event determination whether the first event corresponds to one of the transitions may be made (550). For example, the transition identifier 130 may identify the transitions 132 between the matching states 128. Then for example, the state engine 136 may make an event determination as to whether the first event 110 corresponds to any of the transitions 132.

Whether the final state has been achieved may be determined based on the event determination (560). For example, the state identifier 126 may identify the final state 140 from amongst the matching states 128. Then for example, the state engine 138 may update the active states 138 based on the event determination and may determine whether the final state 140 has been achieved if it exists amongst the active states 138.

The one or more identified components may be provided based upon a determination of the final state being achieved (570). For example, the delivery engine 142 may provide the identified components 106A, 106B based upon the state engine's 136 determination that the final state 140 has been achieved.

Figure 6:
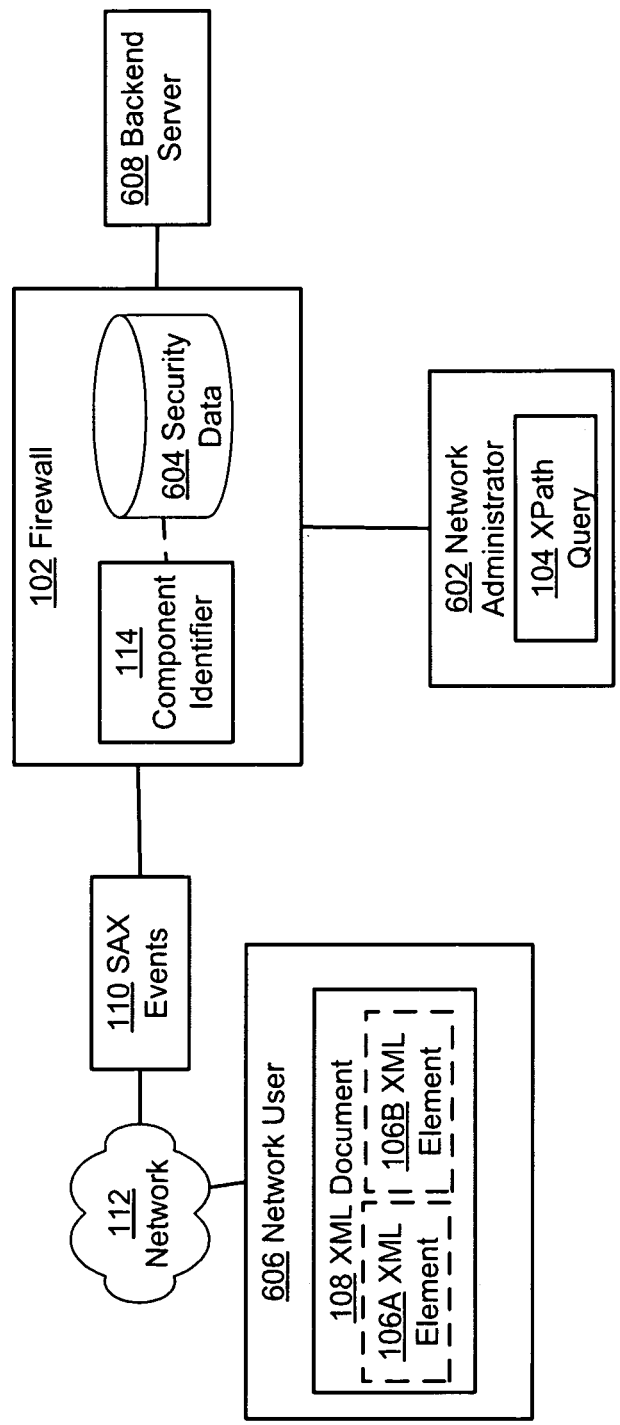
FIG. 6 is a block diagram of a streaming event processing system, according to an example embodiment.

FIG. 6 is a block diagram of a streaming event processing system 600, according to an example embodiment. As referenced above, according to a non-limiting embodiment, the system 100 may be implemented in an XML environment as shown in the system 600. For example, the system 600 may include a security or firewall system configured to validate a user's credentials prior to allowing access to a backend server or other sensitive or secured data.

A network administrator 602 may provide the XPath query 104 to the firewall 102. The network administrator 602 may determine which information or security credentials are to be extracted from the XML document and verified against the security data 604.

A network user 606 trying to gain access to a backend server 608 may provide security credentials which may included in the XML document 108 as the XML elements 106A and 106B. The network 112 may provide the XML document 108 to the firewall 102 as a series of streaming SAX events 110. The component identifier 114 may extract or copy the identified XML elements 106A and 106B, as identified by the XPath query 104, from the SAX events 110 and check them against the security data 604.

The security data 604 may include a database, repository or other system of verifying security information or other information extracted from the XML document 108. For example, the security data 604 may include a list of users, passwords and access rights. Then for example, the firewall 102 may compared the identified XML elements 106A and 106B against the security data 604 to verify the user and password match-up against the security data 604 and that the identified network user 604 has the permissions to access to backend server 608. Upon a verification of this data, the firewall 102 may grant or deny the network user 606 access to the backend server 608. The backend server 608 may include any secured system, network, device or information trying to be accessed by the network user 606.

Figure 7:
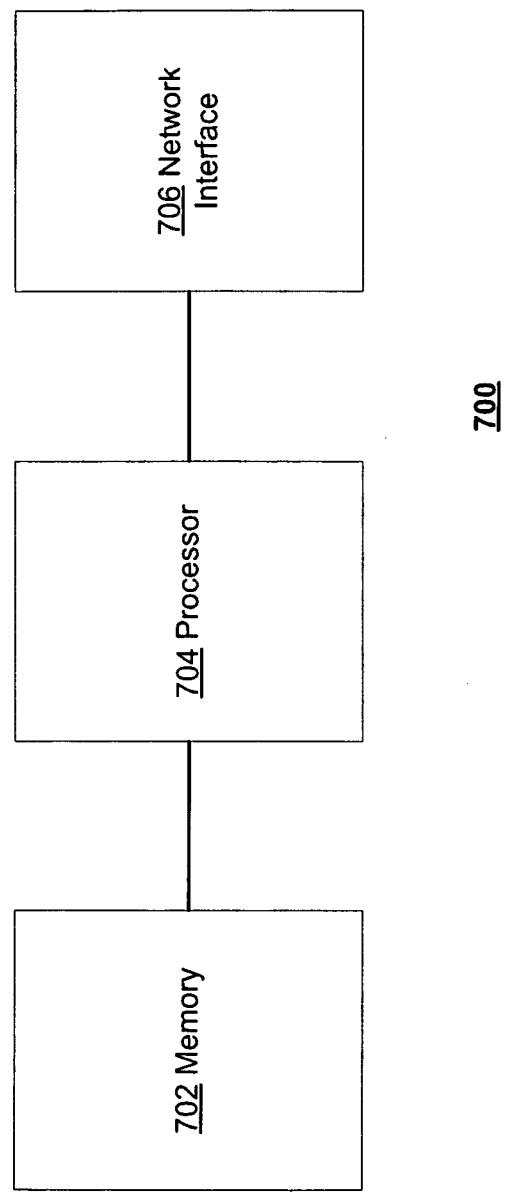
FIG. 7 is a computing system diagram illustrating example components of the streaming event processing system of FIG. 1, according to an example embodiment.

FIG. 7 is a computing system 700 diagram illustrating example components of the streaming event processing system of FIG. 1, according to an example embodiment. For example, the components of the computing system 700 may be included within or otherwise associated with the network device (e.g., 102 of FIG. 1).

The computing system 700 may include a memory 702. The memory 702 may include any storage medium that may hold, store or otherwise retrieve software, firmware and/or other code associated with the functionality of the streaming event processing system. For example, the memory 702 may store or buffer the streamed events 110 or store components 106A, 106B as they are identified.

A processor 704 may provide overall control and/or execution for the system 700. For example, the processor 704 may execute or otherwise access the information or code stored by the memory 702. According to an example embodiment, the processor 704 may execute the functionality of the network device 102, as discussed above and including the functionality of its components or related systems (e.g., component identifier 114).

A network interface 706 may provide an interface to one or more devices or components. For example, the network interface 706 may provide an interface to a network, such as network 112 (of FIG. 1) and/or backend server 608 (of FIG. 6). The network interface 706 may be configured to allow the streaming of events 110, as described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data.

Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. An apparatus comprising:
a processor;
a memory storing executable code that, when executed by the processor, is configured to cause the processor to:
receive a query for one or more components of a document;
receive events corresponding to the document;
generate a forward axis graph based on the query and corresponding to an in-order traversal of the document as associated with the events, the forward axis graph including a plurality of nodes with edges connecting the nodes;
identify, independently from the received events, a plurality of matching states of the forward axis graph including at least one final state, each matching state including a subset of one or more of the nodes wherein each incoming edge to the subset originates from one of the nodes of the subset;
determine, independently from the received events, transitions between the matching states, wherein at least one of the transitions comprises a multiple event transition comprised of two incoming edges to the same node; and
determine whether the final state is achieved based on which of the received events correspond to the multiple event transition and determine whether the one or more components of the query exist within the document based on whether the final state is achieved.

2. The apparatus of claim 1 wherein the processor being configured to receive the query comprises the processor being configured to receive the query including a plurality of location steps descending from a root, the plurality of location steps identifying the one or more components.

3. The apparatus of claim 2 wherein the plurality of nodes correspond to the plurality of location steps.

4. The apparatus of claim 1 wherein the processor being configured to receive the query comprises the processor being configured to receive the query including one or more optional components for identification within the document.

5. The apparatus of claim 1 wherein the processor being configured to generate comprises the processor being configured to generate the forward axis graph including the plurality of nodes, each node being associated with at least one of an outgoing edge or an incoming edge.

6. The apparatus of claim 1 wherein the processor is further configured to provide the components of the document based upon a determination that the final state has been achieved.

7. The apparatus of claim 6 wherein:
the processor is further configured to identify an end of the document based on the received events;
the processor is further configured to determine that the final state has not been achieved; and
the processor is further configured to provide an indication that the one or more components could not be identified within the document.

8. The apparatus of claim 1 wherein the processor being configured to determine whether a final state is achieved comprises the processor being configured to determine that the final state has been achieved based upon a receipt of events corresponding to each transition.

9. The apparatus of claim 1 wherein the processor being configured to determine whether a final state is achieved comprises the processor being configured to identify one or more of the matching states as being active based on a determination that the received event corresponds to one or more of the transitions and determine that the final state has been achieved based on one or more active matching states.

10. The apparatus of claim 1 wherein the processor being configured to receive events comprises the processor being configured to receive a stream of events comprising a simple application programming interface (API) for extensible markup language (SAX) stream.

11. The apparatus of claim 1 wherein the processor being configured to generate a forward axis graph comprises the processor being configured to generate the forward axis graph based on an extensible markup language (XML) path language (XPATH) query for one or more components of an XML document.

12. The apparatus of claim 1 wherein the processor being configured to identify comprises the processor being configured to identify the components in the document and to provide them to a firewall for verification against security data.

13. The apparatus of claim 12 wherein the firewall is configured to allow data to pass from a network user to a backend server based upon the verification of the identified components against the security data.

14. A method comprising:
generating a forward axis graph based on a query for one or more components of a document, the forward axis graph including a plurality of nodes connected by edges and arranged based on an in-order traversal of events corresponding to the document;
identifying, independently from the events corresponding to the document, a plurality of matching states within the forward axis graph, each matching state including a subset of the nodes wherein each incoming edge to the nodes of the subset originates from a node of the subset;
identifying, from the matching states, a final state for determining whether the one or more components of the document have been identified;
identifying, independently from the events corresponding to the document, one or more transitions between each of the matching states based on the incoming edges, wherein at least one of the transitions comprises a multiple event transition comprised of two incoming edges to the same node; and
determining whether the document includes the one or more components of the query based on whether the multiple event transition to the final state has been identified from amongst the events.

15. The method of claim 14 wherein the determining whether the document includes the one or more components of the query comprises determining whether a simple application programming interface (API) for extensible markup language (SAX) stream of events corresponding to an extensible markup language (XML) document include the one or more components of an XML path language (XPATH) query.

16. The method of claim 14 wherein the identifying one or more transitions comprises identifying the one or more transitions between each of the matching states wherein the transitions differentiate the matching states based on the events.

17. The method of claim 14 further comprising providing values of the one or more components from the document based upon a determination that the final state has been achieved.

18. A method for identifying one or more components of a document based on
a stream of events corresponding to the document, the method comprising:
determining a forward axis graph based on a query for one or more components of a document, the forward access graph including nodes connected by edges corresponding to the query;
arranging, independently from the events corresponding to the document, the nodes into a plurality of matching states with transitions between the matching states corresponding to the edges, each matching state including a subset of one or more of the nodes wherein each incoming edge to the subset originates from one of the nodes of the subset, and wherein at least one of the transitions comprises a multiple event transition comprised of two incoming edges to the same node;
identifying, from amongst the matching states, a final state for determining whether the one or more components of the document have been identified;
repeating for each event of a stream of events corresponding to a document until the final state is achieved:
receiving a first event from the stream of events,
making an event determination whether the first event corresponds to one of the multiple event transition, and
determining whether the final state has been achieved based on the event determination; and providing the one or more identified components based upon a determination of the final state being achieved.

19. The method of claim 18 wherein the making an event determination comprises:
determining that the first event corresponds to a first transition; and
identifying a first matching state corresponding to the first transition as being among one or more active states.

20. The method of claim 19 wherein the determining whether the final state has been achieved comprises determining whether the final state is among the active states.

21. Software encoded in one or more non-transitory computer-readable media and when executed by a processor is configured to:
generate a forward axis graph based on a query for one or more components of a document, the forward axis graph including a plurality of nodes connected by edges and arranged based on an in-order traversal of events corresponding to the document;
identify, independently from components of the documents, a plurality of matching states within the forward axis graph, each matching state including a subset of the nodes wherein each incoming edge to the nodes of the subset originates from a node of the subset;
identify, from the matching states, a final state for determining whether the one or more components of the document have been identified;

identify, independently from the components of the documents, one or more transitions between each of the matching states based on the incoming edges, wherein at least one of the transitions comprises a multiple event transition comprised of two incoming edges to the same node; and determine whether the document includes the one or more components of the query based on whether the multiple event transition to the final state has been identified from amongst the events.

22. The software of claim 21, further configured to:

determine whether a simple application programming interface (API) for extensible markup language (SAX) stream of events corresponding to an extensible markup language (XML) document include the one or more components of an XML path language (XPATH) query.

23. The software of claim 21, further configured to:

receive a first event of the events;

determine whether the first event corresponds to one of the transitions; and if the first event corresponds to one of the transitions, determine whether the final state has been identified based on the transition corresponding to the first event.

24. The software of claim 21, further configured to:

determine that the final state has been identified; and provide values from the document corresponding to the components of the query.

25. The software of claim 21, further configured to:

identify which of the components of the query are to be returned from the document upon an identification of the final state from amongst the events.

* * * * *

UNITED STATES PATENT AND TRADEMARK OFFICE
CERTIFICATE OF CORRECTION

PATENT NO. : 8,630,997 B1  
APPLICATION NO. : 12/398810  
DATED : January 14, 2014  
INVENTOR(S) : Maxim Kulkin et al.

Page 1 of 1

It is certified that error appears in the above-identified patent and that said Letters Patent is hereby corrected as shown below:

Title Page, Item (54) and in the Specification at Column 1, line 1, Title: replace "STREAMING EVENT PROCESING" with -- STREAMING EVENT PROCESSING --.

Signed and Sealed this
Eighth Day of April, 2014

Michelle K. Lee
*Deputy Director of the United States Patent and Trademark Office*